United States Patent
Elahi et al.

(10) Patent No.: US 11,356,858 B2
(45) Date of Patent: Jun. 7, 2022

(54) PERFORMANCE SIMULATION OF A DISTRIBUTED MIMO ANTENNA SYSTEM

(71) Applicant: Telefonaktiebolaget LM Ericsson (publ), Stockholm (SE)

(72) Inventors: Aroosh Elahi, Gloucester (CA); Hazik Ahmad, Whitby (CA); Ramy H. Gohary, North Gower (CA); Ioannis Lambadaris, Ottawa (CA); Emmanouil Skevakis, Gatineau (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 39 days.

(21) Appl. No.: 17/056,666

(22) PCT Filed: Apr. 24, 2019

(86) PCT No.: PCT/IB2019/053395
§ 371 (c)(1),
(2) Date: Nov. 18, 2020

(87) PCT Pub. No.: WO2019/220244
PCT Pub. Date: Nov. 21, 2019

(65) Prior Publication Data
US 2021/0211891 A1    Jul. 8, 2021

Related U.S. Application Data

(60) Provisional application No. 62/673,443, filed on May 18, 2018.

(51) Int. Cl.
*H04W 16/20*  (2009.01)
*H04B 17/336* (2015.01)
*H04B 7/0413* (2017.01)

(52) U.S. Cl.
CPC .......... *H04W 16/20* (2013.01); *H04B 7/0413* (2013.01); *H04B 17/336* (2015.01)

(58) Field of Classification Search
CPC .... H04W 16/20; H04W 16/18; H04B 7/0413; H04B 17/336
See application file for complete search history.

(56) References Cited

U.S. PATENT DOCUMENTS

| | | |
|---|---|---|
| 7,085,697 B1 | 8/2006 | Rappaport et al. |
| 2006/0280262 A1 | 12/2006 | Malladi |

(Continued)

FOREIGN PATENT DOCUMENTS

| | | |
|---|---|---|
| CN | 102098689 A | 6/2011 |
| WO | 2012000032 A1 | 1/2012 |
| WO | 2019220243 A1 | 11/2019 |

OTHER PUBLICATIONS

International Search Report and Written Opinion for International Patent Application No. PCT/IB2019/053393, dated Sep. 12, 2019, 15 pages.

(Continued)

*Primary Examiner* — Tejis Daya
(74) *Attorney, Agent, or Firm* — Withrow & Terranova, PLLC

(57) ABSTRACT

Systems and methods for determining a performance metric for an antenna deployment are provided. In some embodiments, a method includes obtaining the antenna deployment including antennas and corresponding locations for the antennas, a cell assignment for the antennas such that each antenna is assigned to one cell out of one or more cells, and a resource assignment for the antennas such that each antenna is assigned to one radio resource out of one or more radio resources. Based on the antenna deployment, the cell assignment, and the resource assignment, the method determines at least one performance metric of the antenna (Continued)

deployment. In this way, some embodiments disclosed herein provide a lightweight & efficient method to simulate the performance of a MIMO network composed of distributed antennas. In some embodiments, the performance is realized by calculating SINR, Bitrate, and Rank for the network.

24 Claims, 12 Drawing Sheets

(56) References Cited

U.S. PATENT DOCUMENTS

| | | | | |
|---|---|---|---|---|
| 2010/0067435 | A1* | 3/2010 | Balachandran | H04L 5/0037 370/328 |
| 2010/0166098 | A1* | 7/2010 | Luz | H04B 7/0689 375/267 |
| 2012/0322492 | A1* | 12/2012 | Koo | H04B 7/022 455/517 |
| 2013/0183961 | A1* | 7/2013 | Bassiri | H04W 16/20 455/446 |

OTHER PUBLICATIONS

Written Opinion for International Patent Application No. PCT/IB2019/053393, dated Apr. 8, 2020, 8 pages.
International Preliminary Report on Patentability for International Patent Application No. PCT/IB2019/053393, dated Jul. 7, 2020, 23 pages.
International Search Report and Written Opinion for International Patent Application No. PCT/IB2019/053395, dated Aug. 27, 2019, 14 pages.
Written Opinion for International Patent Application No. PCT/IB2019/053395, dated Feb. 27, 2020, 5 pages.
International Preliminary Report on Patentability for International Patent Application No. PCT/IB2019/053395, dated Aug. 4, 2020, 37 pages.
U.S. Appl. No. 17/056,528, filed Nov. 18, 2020.
Office Action for Taiwanese Patent Application No. 108117018, dated Jan. 22, 2022, 9 pages.

\* cited by examiner

PERFORMANCE SIMULATION OF A DISTRIBUTED MIMO ANTENNA SYSTEM

RELATED APPLICATIONS

This application is a 35 U.S.C. § 371 national phase filing of International Application No. PCT/IB2019/053395, filed Apr. 24, 2019, which claims the benefit of provisional patent application Ser. No. 62/673,443, filed May 18, 2018, the disclosures of which are hereby incorporated herein by reference in their entireties.

TECHNICAL FIELD

The disclosure relates to designing wireless communications, and in particular, to designing Multiple-Input and Multiple-Output (MIMO) networks.

BACKGROUND

Planning products can be used to design network deployments. Some enable the automation of some of the planning process, significantly reducing planning times. Some planning products enable users to import a floor plan and use it to create a plan for the locations of network products and associated cabling. Users can modify several floor attributes including wall materials and structures to produce more accurate planning results. Users can also modify node locations to suit their own situation. Output from the tool sometimes includes a coverage report, a Bill of Materials to help in ordering, and a solution report listing the required hardware and cabling on each floor of the building.

There currently exist solutions for simulating the performance of Multiple-Input and Multiple-Output (MIMO) networks where antennas are placed in very close proximity (approximately a few centimeters apart).

Existing solutions cannot simulate the performance of a MIMO network where antennas are distributed (i.e. placed far apart from each other). As such, additional ways of determining a performance metric for an antenna deployment are needed.

SUMMARY

Systems and methods for determining a performance metric for an antenna deployment are provided. In some embodiments, a method includes obtaining the antenna deployment including antennas and corresponding locations for the antennas, a cell assignment for the antennas such that each antenna is assigned to one cell out of one or more cells, and a resource assignment for the antennas such that each antenna is assigned to one radio resource out of one or more radio resources. Based on the antenna deployment, the cell assignment, and the resource assignment, the method determines at least one performance metric of the antenna deployment. In this way, some embodiments disclosed herein provide a lightweight & efficient method to simulate the performance of a MIMO network composed of distributed antennas. In some embodiments, the performance is realized by calculating SINR, Bitrate, and Rank for the network.

The proposed solution is composed of simulating a Multiple-Input and Multiple-Output (MIMO) network where the antennas are distributed and evaluating its performance. Some embodiments disclosed herein provide a lightweight & efficient method to simulate the performance of a MIMO network composed of distributed antennas. In some embodiments, this performance is realized by calculating Signal-to-Interference-plus-Noise Ratio (SINR), Bitrate, and Rank for the network.

Given a deployment of antennas and the assignment of radio resources to antennas, an achievable Rank is calculated across the corresponding area. The Rank characteristics are then used to determine an equivalent signal strength. This effective signal strength is converted to performance metrics like SINR and bitrate. Using the Rank characteristics again, an achievable bitrate is calculated. This allows the method to calculate Rank and use of Rank as weights in calculating an equivalent signal and in turn a bitrate, for antennas in a Distributed MIMO network.

There are, proposed herein, various embodiments which address one or more of the issues disclosed herein. In some embodiments, the at least one of obtaining the antenna deployment, obtaining the cell assignment, and obtaining the resource assignment comprises receiving the antenna deployment, the cell assignment, and the resource assignment, respectively.

In some embodiments, at least one of obtaining the antenna deployment, obtaining the cell assignment, and obtaining the resource assignment comprises generating the antenna deployment, the cell assignment, and the resource assignment, respectively.

In some embodiments, determining the at least one performance metric comprises determining a rank of the antenna deployment. In some embodiments, determining the rank of the antenna deployment includes determining a minimum target metric required to achieve exactly a rank of one; for each cell and for each data stream in this cell: determining a target metric received in a given area; determining that the rank of this data stream is the ratio of the target metric to the minimum target metric; and determining that the rank of this cell is the sum of the ranks of each data stream in this cell; and determining that the rank of the antenna deployment is the maximum rank of the rank of each of the cells.

In some embodiments, the target metric is either SNR or SINR. In some embodiments, the rank of this data stream is a maximum of one.

In some embodiments, determining the at least one performance metric comprises determining a cumulative signal of the antenna deployment. In some embodiments, determining the cumulative signal of the antenna deployment comprises: for each cell determining a signal power received from each data stream; and determining that the cumulative signal of the antenna deployment is the weighted average of the signal power received from each data stream.

In some embodiments, the rank of each data stream is used as the weight for that data stream in the weighted average. Alternatively, the resulting cell signal can be found by summing the signals of all data streams of the same cell, instead of using the weighted average approach.

In some embodiments, determining the at least one performance metric further comprises determining an achievable bitrate of the antenna deployment. In some embodiments, determining the achievable bitrate of the antenna deployment comprises: converting the cumulative signal of the antenna deployment to at least one of a SNR and a SINR; mapping the at least one of the SNR and the SINR to a bitrate for each N×N Multiple-Input and Multiple-Output, MIMO, combination; determining a ceiling of the rank of the antenna deployment and a floor of the rank of the antenna deployment; and determining the achievable bitrate of the antenna deployment as the weighted average of the bitrate mapped to by the ceiling of the rank and the bitrate mapped to by the floor of the rank.

In some embodiments, the ceiling of the rank and the floor of the rank for the bitrate mapped to the ceiling of the rank and the floor of the rank is used as a weight for that bitrate in the weighted average.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Figure 1:
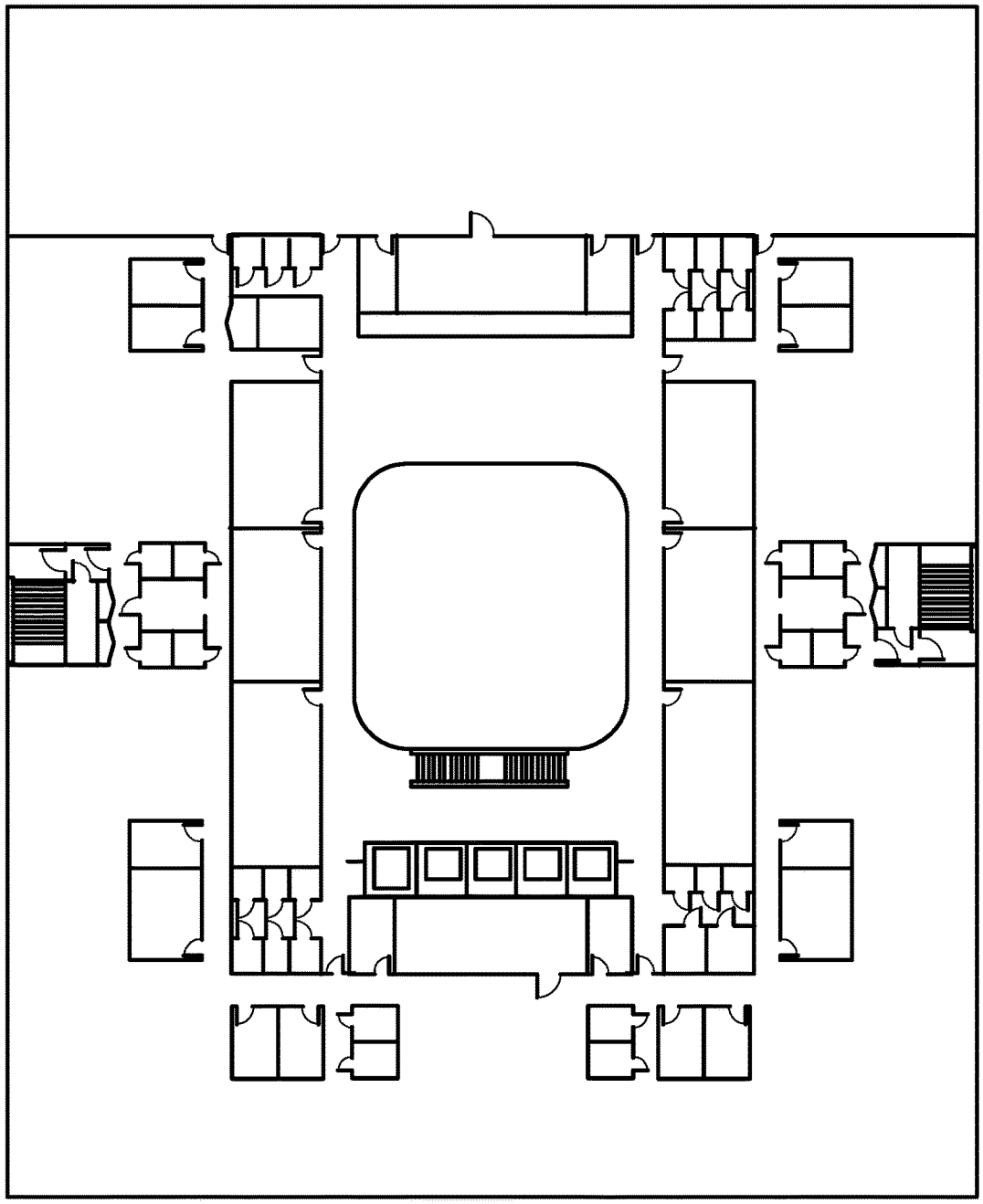
FIG. 1 illustrates a sample floorplan, according to some embodiments of the present disclosure.

As discussed in more detail below, many of the embodiments discussed herein relate to planning and implementing an indoor network deployment. However, these embodiments are not limited thereto and could be applicable in many contexts. In some embodiments, a floorplan is used such as is shown in FIG. 1. This may include outside walls, inside walls and various other structures. Additionally, the materials of these structures may be defined and/or the radio propagation characteristics may be known or derived.

Figure 2:
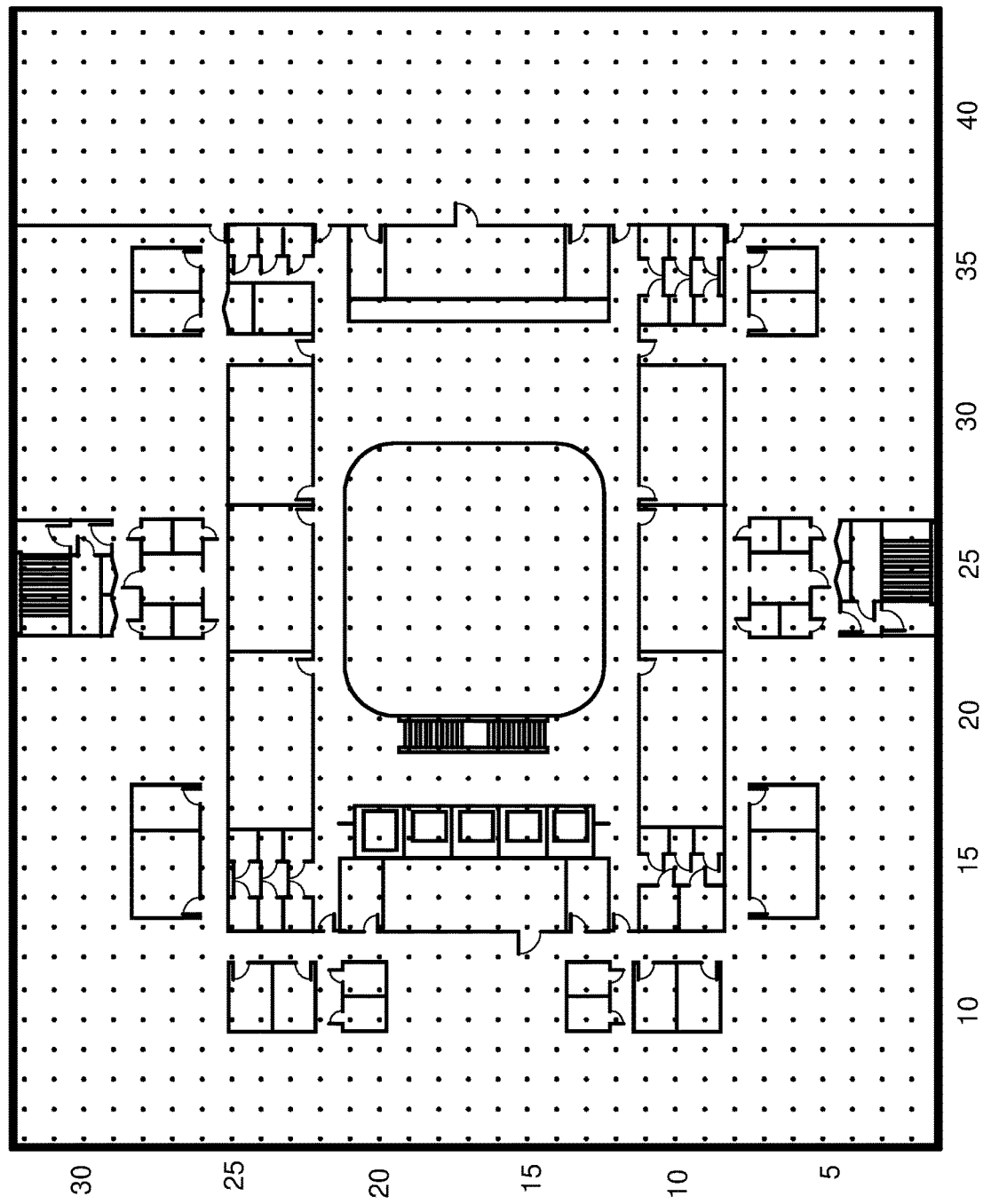
FIG. 2 illustrates an example floorplan that has been segmented into discrete locations, according to some embodiments of the present disclosure.
Figure 3:
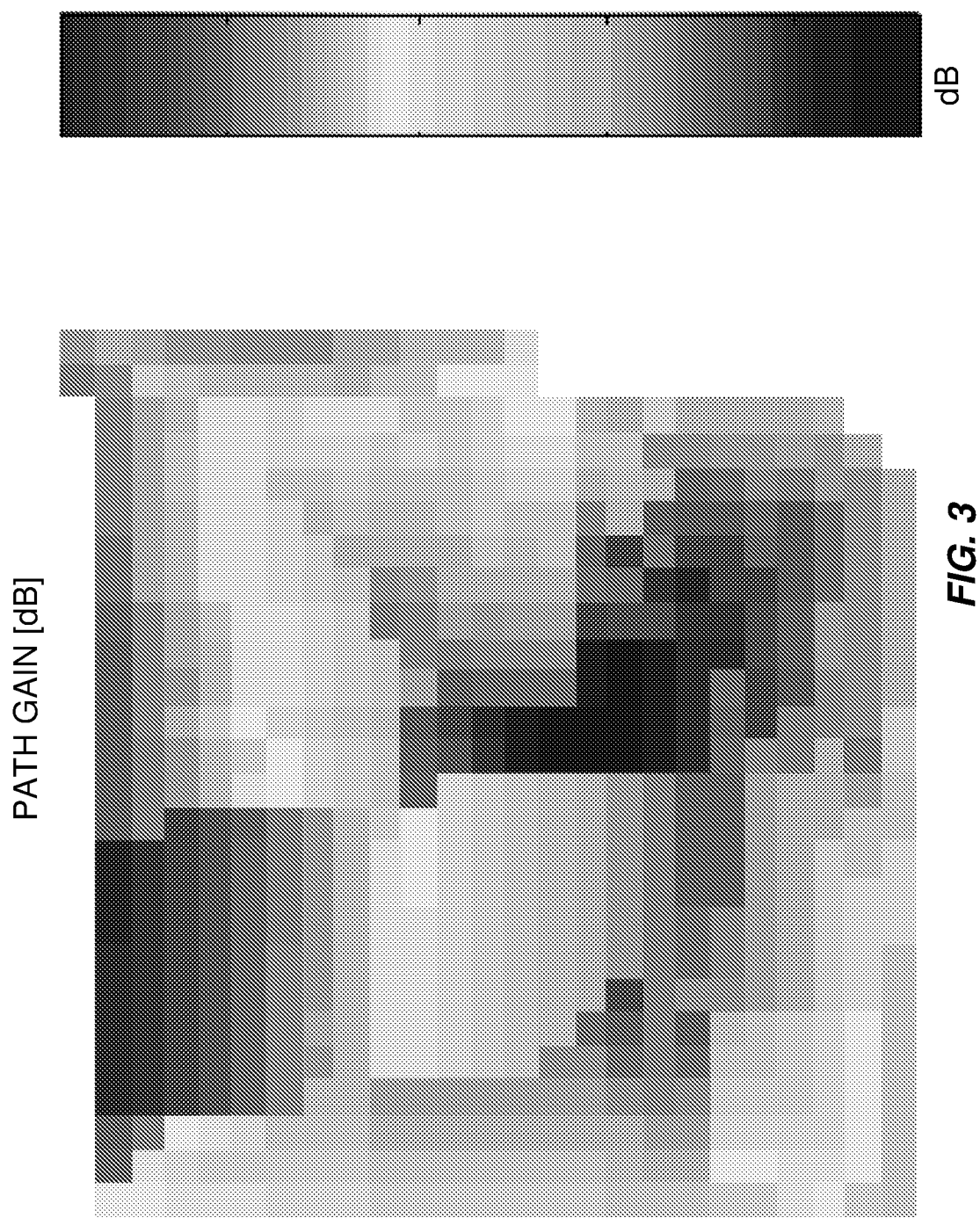
FIG. 3 illustrates an example where path gain is computed for the points in the floorplan, according to some embodiments of the present disclosure.

FIG. 2 illustrates another example floorplan that has been segmented into discrete locations. In this example, many individual points inside the floorplan are assigned x, y coordinates. If an antenna is placed in this floorplan, various radio characteristics can be calculated for these x, y coordinates. For instance, FIG. 3 shows an example where path gain is computed for the points in the floorplan.

Figure 4:
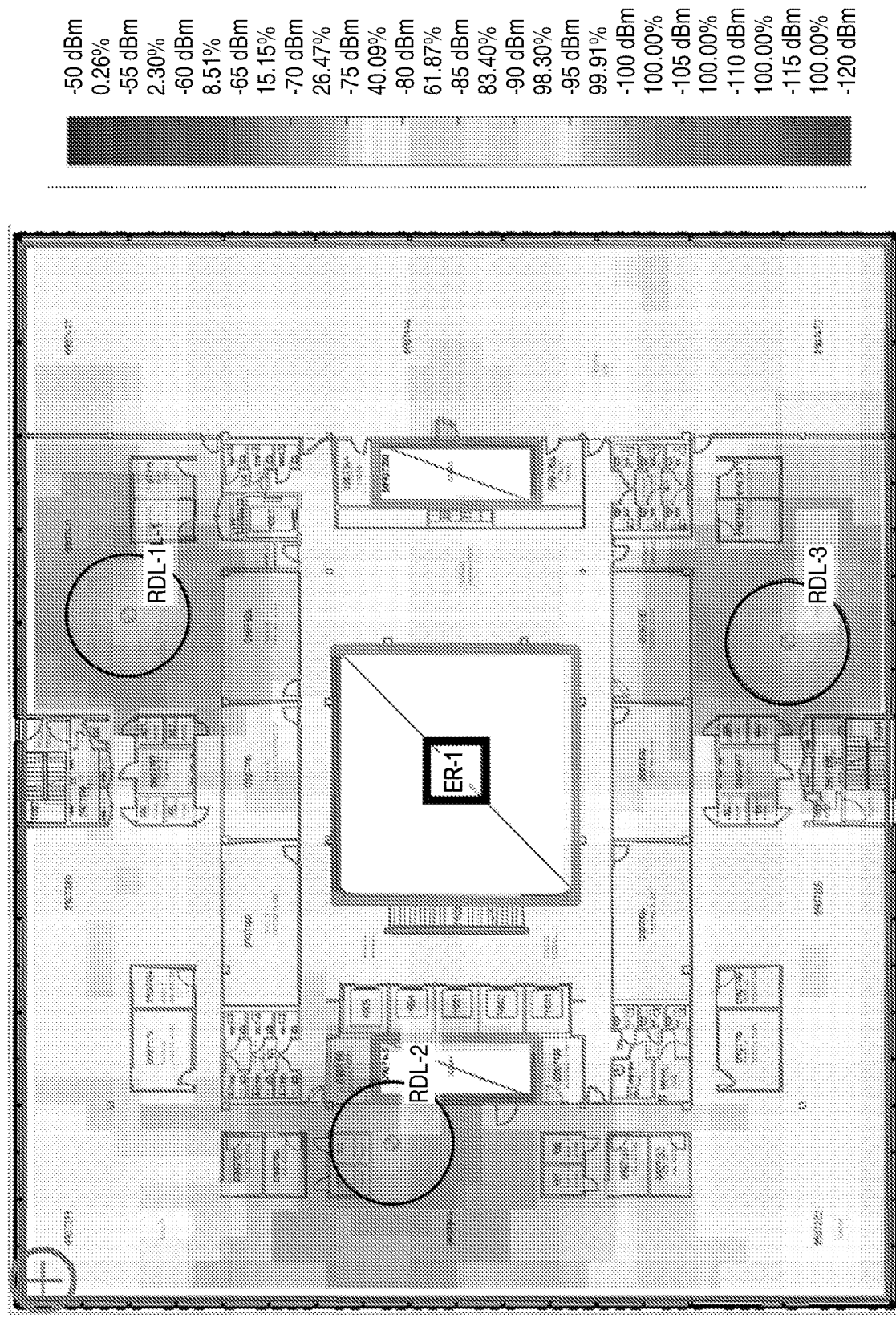
FIG. 4 illustrates a more detailed visualization of the floorplan of FIG. 1 in which there are three antennas at specific locations, according to some embodiments of the present disclosure.

FIG. 4 shows a more detailed visualization of the floorplan of FIG. 1. In this figure, there are three antennas at specific locations and the values of the signal are shown using different colors.

There currently exist solutions for designing Multiple-Input and Multiple-Input and Multiple-Output (MIMO) networks where antennas are placed in very close proximity (approximately a few centimeters apart). However, existing solutions are not capable of simulating the performance of a MIMO network where antennas are distributed (i.e. placed far apart from each other).

Systems and methods for determining a performance metric for an antenna deployment are provided. In some embodiments, a method includes obtaining the antenna deployment including antennas and corresponding locations for the antennas, a cell assignment for the antennas such that each antenna is assigned to one cell out of one or more cells, and a resource assignment for the antennas such that each antenna is assigned to one radio resource out of one or more radio resources. Based on the antenna deployment, the cell assignment, and the resource assignment, the method determines at least one performance metric of the antenna deployment. This may provide a lightweight and efficient method to design a distributed antenna deployment. The resulting network may be optimized in terms the total area where a high rank is achieved.

Figure 5:
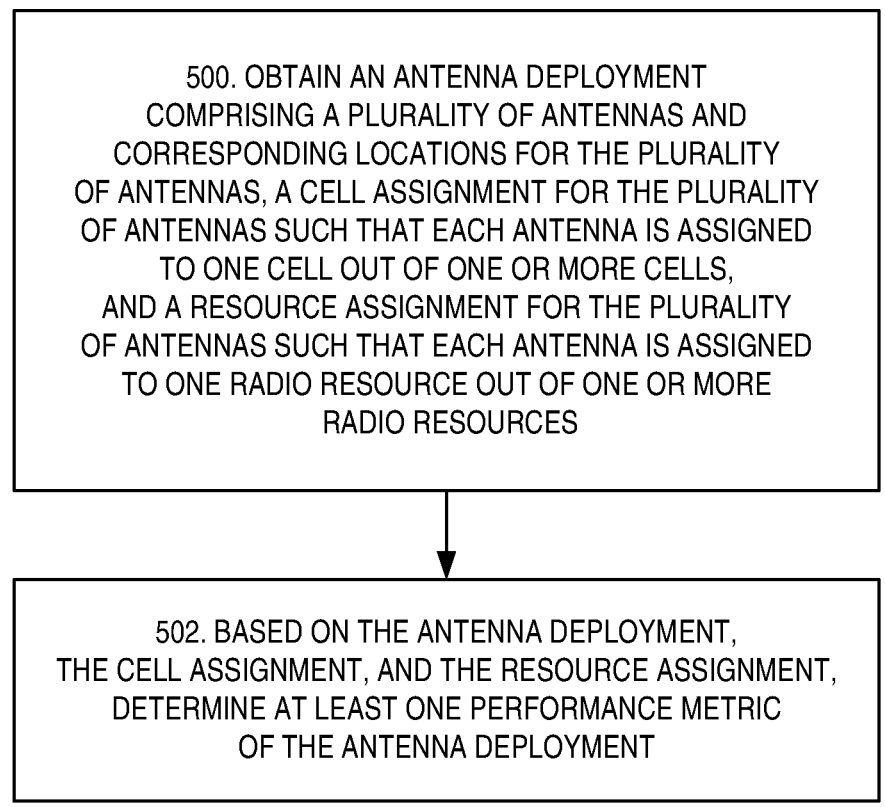
FIG. 5 illustrates a method for determining an assignment of radio resources to antennas, according to some embodiments of the present disclosure.

FIG. 5 illustrates a method for determining a performance metric for an antenna deployment. First, an antenna deployment including antennas and corresponding locations for the antennas, a cell assignment for the antennas such that each antenna is assigned to one cell out of one or more cells, and a resource assignment for the antennas such that each antenna is assigned to one radio resource out of one or more radio resources are obtained (step 500). Then, based on the antenna deployment, the cell assignment, and the resource assignment, the method determines at least one performance metric of the antenna deployment (step 502).

In some embodiments, the method takes an antenna deployment as an input. This input can be user-defined or automatically generated by an optimization algorithm. The x and y coordinates of the antennas and the path loss of the deployment area are used to compute the following outputs: assignment of antennas to radio resources (also referred to as data streams) and cells. In a N×N MIMO network each cell transmits N data streams. Antennas can only transmit a single, unique data stream, as such data streams must be assigned to antennas optimally such that users see the maximum benefit of a MIMO network. MIMO network performance is maximized when a good signal is received from each unique data stream.

Figure 6:
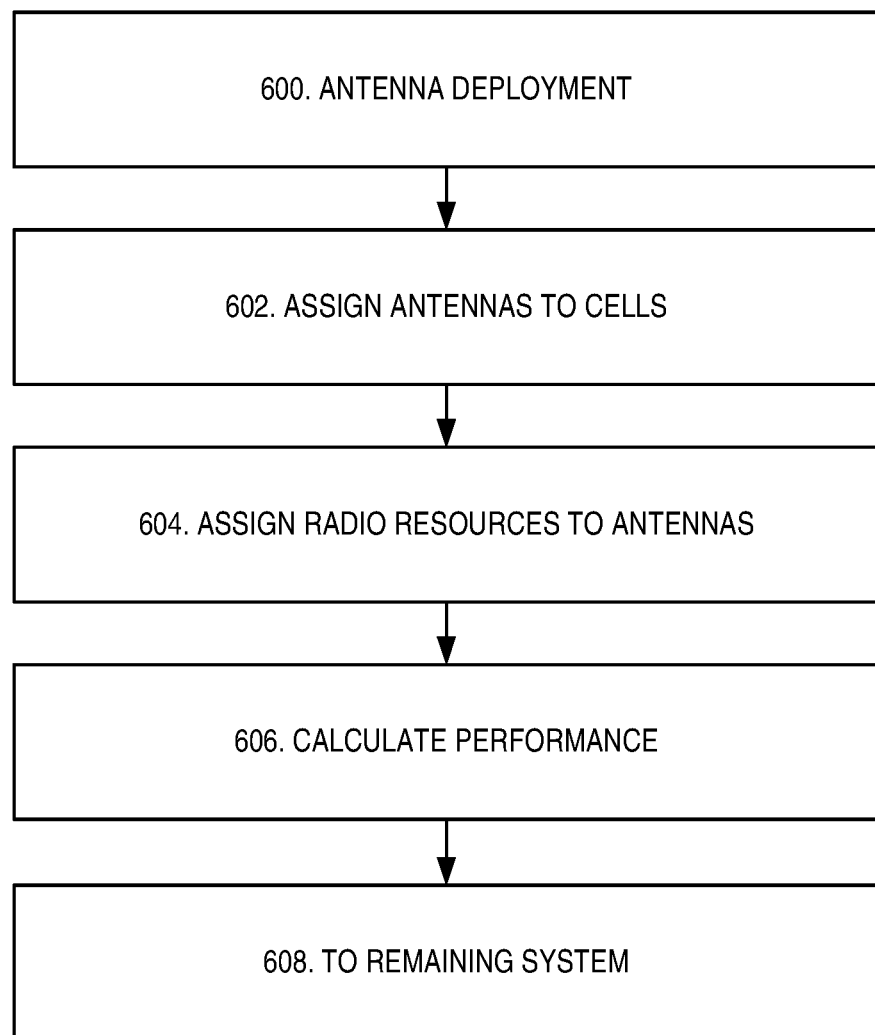
FIG. 6 illustrates an integration of some current embodiments with an existing deployment tool, according to some embodiments of the present disclosure.

To evaluate the solution that is proposed, the Ericsson Indoor Planner (EIP) tool is used to generate an antenna deployment. The solution is inserted after the deployment step and after radio resources are assigned to antennas. FIG. 6 realizes the integration of this solution with an existing deployment tool. Given an existing antenna deployment such as a Distributed Antenna System (DAS) head deployment, each head is assigned first to a cell and then to a radio;

via the processes depicted in FIG. 6. Starting with an antenna deployment (step 600), antennas are assigned to cells (step 602). Then radio resources are assigned to the antennas (step 604). The performance can then be calculated (step 606) and the method can return to some remaining system (608). Additional details regarding the calculation of performance are provided in FIGS. 7 through 10.

Figure 7:
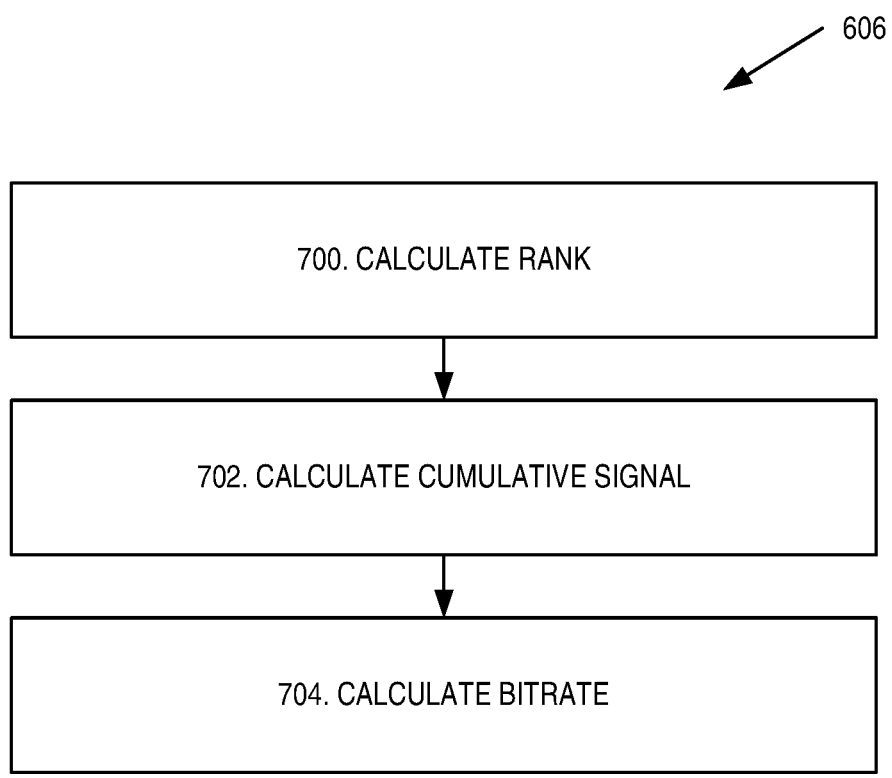
FIG. 7 illustrates a method of operation, according to some embodiments of the present disclosure.

FIG. 7 illustrates an example implementation of step 606. In some embodiments, all three of these steps are performed. In other embodiments, only a subset of these steps is performed. First, the Rank of the antenna deployment is calculated (step 700). Then, a cumulative signal is calculated (step 702). In some embodiments, based on the results of the previous two steps, the bitrate for the antenna deployment can be calculated (step 704). Given an existing antenna deployment and the assignment of radio resources to antennas, FIGS. 8, 9, and 10 outline exemplary methods used to calculate Rank, cumulative signal, and bitrate. In the following figures, once a radio resource has been assigned to an antenna, that antenna emits a data stream unique to that radio resource.

Figure 8:
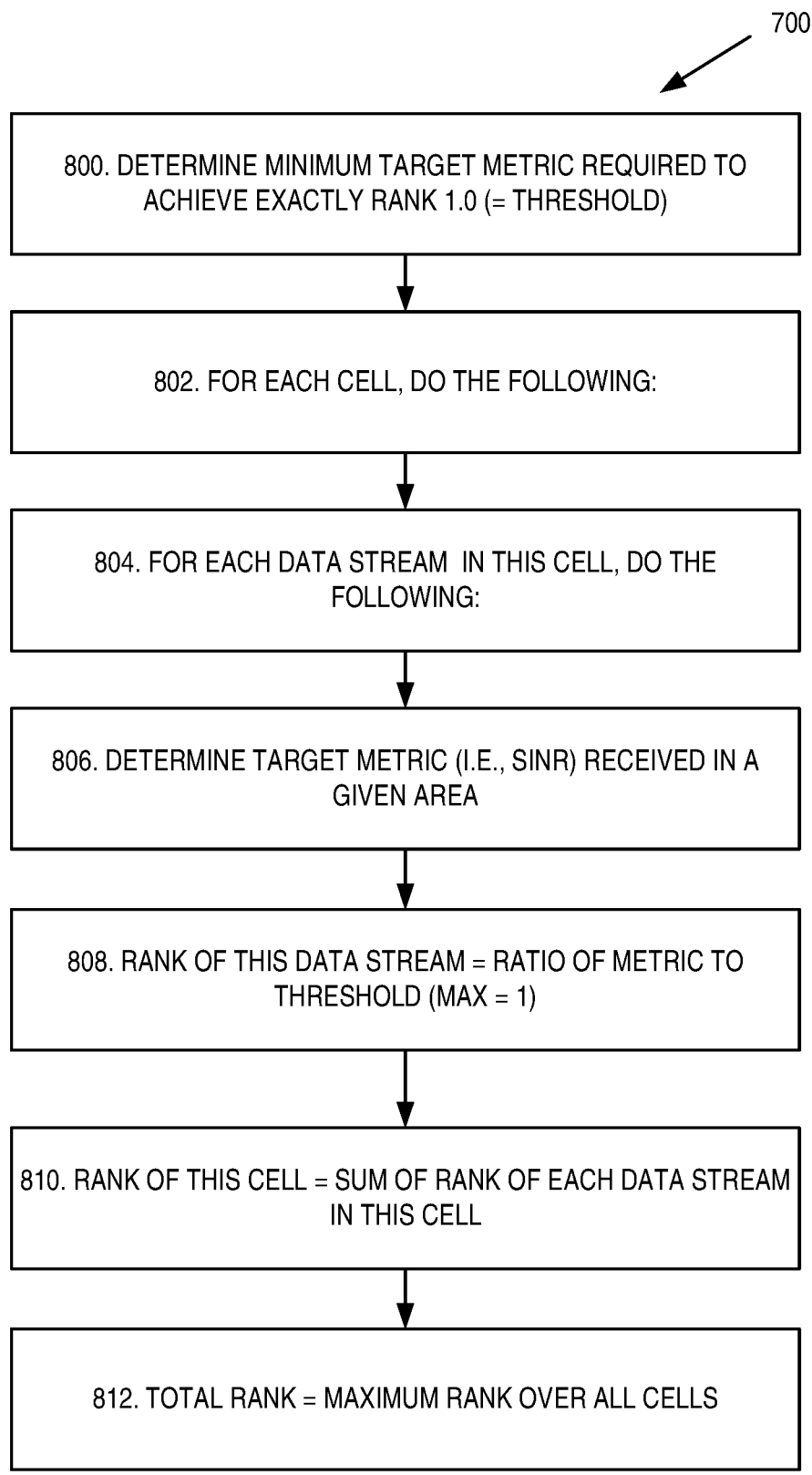
FIG. 8 illustrates a method of operation, according to some embodiments of the present disclosure.

FIG. 8 illustrates an exemplary implementation of step 700. Given an existing antenna deployment and the assignment of radio resources to antennas, the Rank achieved in various positions can be calculated. The first step is to choose an appropriate metric (or combination) that has a strong relationship to the Rank. Using this metric, find the threshold required to achieve at least a Rank of 1.0 (step 800). In one implementation of this solution in the Ericsson Indoor Planner tool, empirical data was collected, and a threshold was extracted. The following steps are then taken to calculate Rank (using signal power as the metric):

1. For each data stream in each cell (steps 802 and 804), determine a target metric received in a given area by, for example, summing the signal power from all antennas received in a given area (806).
2. Calculate the ratio of this summed signal, over the noise floor, to the threshold (required to achieve Rank 1.0 as determined earlier) (step 808). The Rank of this data stream (at a point) is the minimum of the calculated ratio or 1. A value of 1 implies that the signal power of this data stream, received by a user, at this point is enough to achieve a Rank of 1.0.
3. The Rank of each cell is then defined as the sum of the Rank of each data stream within the cell (step 810).

The total Rank for this antenna deployment is the maximum rank over all of the cells (step 812).

Figure 9:
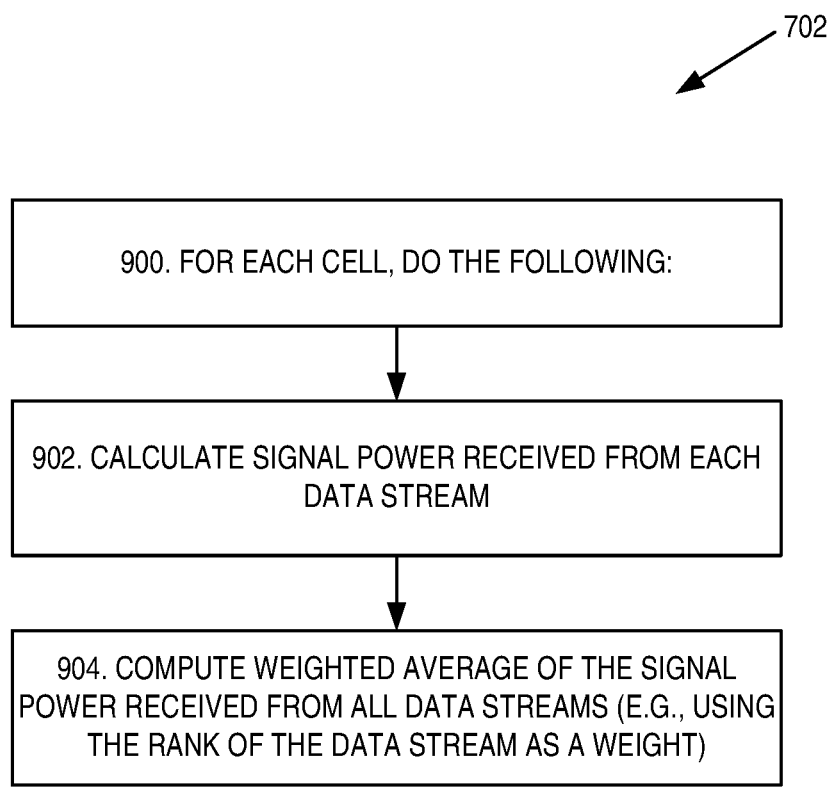
FIG. 9 illustrates a method of operation, according to some embodiments of the present disclosure.

FIG. 9 illustrates an exemplary implementation of step 702. For a deployment with antennas assigned to cells and radio resources, the per-data stream Rank can be used to find an equivalent cumulative signal. To do this, for each cell (step 900), the signal received from antennas emitting the same data stream is summed (step 902). The summed signal of each data stream is then multiplied by a weight derived from its Rank and summed with the weighted signals of the other data streams in this cell (step 904). Alternatively, the resulting cell signal can be found by summing the signals of all data streams of the same cell, instead of using the weighted average approach.

Figure 10:
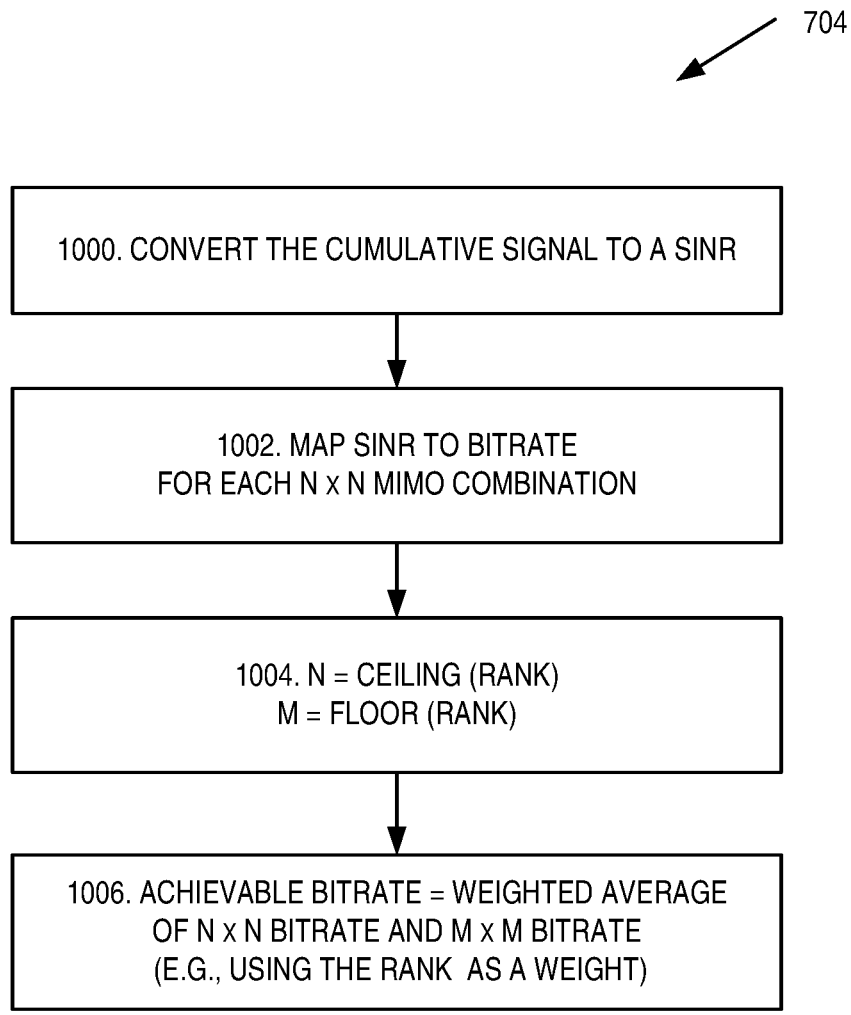
FIG. 10 illustrates a method of operation, according to some embodiments of the present disclosure.

FIG. 10 illustrates an exemplary implementation of step 704. In order to calculate the bitrate, the cumulative signal must be converted to a SINR (step 1000) and this SINR, in turn, is converted to a bitrate. If the maximum achievable Rank is N, then a unique SINR to bitrate conversion is done for each of the following 1×1, 2×2, . . . , N×N antenna configurations (step 1002).

M=floor(Rank) and N=ceiling(Rank) (step 1004). For a given area, the achievable bitrate is calculated as the weighted average of the M×M and N×N bitrates (where M and N are the closest integers to the Rank achieved in this area) (step 1006). The weight is determined by how close the achieved Rank is to M and N.

For illustrative purposes, pseudocode for performing some of the methods discussed herein is provided. This only represents an example implementation and the current disclosure is not limited thereto.

```
[totalRank, cumulativeSignal, bitrate] = calculatePerformance (deployment, xyArea,
pathGain, interferenceAncNoise, TxPower, rateMap, nStreams, thresholdForRank1) {
    /*
        deployment is either a user input OR is auto-generated (not part of IvD)
        pre-calculated variables:
        * xyArea
            * x & y coordinates for every point in the Area of Interest (AoI)
        * pathGain
            * path gain from point A to point B, where A and B are both points in the deployment
area
        * interferenceAncNoise
            * random noise and interference from other sources received at each point in the AoI
        * rateMap
            * a table that correlates SNR to throughput, for a given MIMO configuration
            * these can be found by collecting data in a lab or using simulation software
            * ratemaps are required for all MxM MIMO configurations, where M <= N
            * e.g. 1x1, 2x2, 3x3, ..., NxN
        constants: (can be user-defined)
        * TxPower
            * transmitting power of one antenna
        * nStreams
            * value of N if objective is NxN MIMO
        * thresholdForRank1
            * the 'metric' value that results in exactly Rank 1.0. A value higher than this threshold
will yield no performance improvements. While a value even slightly less than this
threshold will result in a loss of performance.
            * e.g., transmitted signal power can be used as the 'metric' and the signal power that
results in Rank 1.0 will then be used as the 'thresholdForRank1'
    */
    rank = calculateRankPerStream (deployment, xyArea, pathGain, interferenceAncNoise,
TxPower, nStreams, thresholdForRank1)
    totalRank = calculateRank (deployment, xyArea, rank, nStreams)
    cumulativeSignal = calculateCumulativeSignal (deployment, xyArea, rank, pathGain,
```

```
                TxPower, nStreams)
                    /* using cumulativeSignal, calculate SNR (this is not novel to the IvD - there is no
                pseudo code for this function) */
                    SNR = calculateSNR (cumulativeSignal)
                    bitrate = calculateBitrate (deployment, xyArea, totalRank, rateMap, SNR, nStreams)
            }
            [ bitrate ] = calculateBitrate ( xyArea, totalRank, rateMap, SNR ) {
                /*
                xyArea: x & y coordinates for every point in the Area of Interest (AoI)
                xyArea[index] = (x[index], y[index])
                totalRank: the ratio of a streams signal strength to the signal level that results in Rank
            1.0, on a per stream, per cell, per point basis
                totalRank[(x, y)] = totalRank of 'stream' transmitted by 'cell' seen at point 'xy' in the AoI
                rateMap: a user-defined (retrieved from simulations or hardware testing) table that
            correlates SNR to throughput
                rateMap[N, SNR] = the maximum number of bits that can be downloaded at a given
            SNR if there are N transmitting streams in the network
                SNR: the SNR at a point in the AoI
                bitrate: the maximum achievable bitrate at a point in the AoI
                */
                for (xy in xyArea) {
                    rankBelow = floor(totalRank)
                    rankAbove = ceil(totalRank)
                    rankBelowMultiplier = totalRank[xy] - rankBelow
                    rankAboveMultiplier = rankAbove - totalRank[xy]
                    bitrate[xy] = (rateMap[rankBelow, SNR[xy]] * rankBelowMultiplier) +
            (rateMap[rankAbove, SNR[xy]] * rankBelowMultiplier)
                }
            }
            [ cumulativeSignal ] = calculateCumulativeSignal ( deployment, xyArea, rank, pathGain,
            TxPower, nStreams ) {
                /*
                deployment: x and y coordinates AND cell IDs of all the antennas deployed in
            deployment area
                xyArea: x & y coordinates for every point in the Area of Interest (AoI)
                xyArea[index] = (x[index], y[index])
                rank: the ratio of a streams signal strength to the signal level that results in Rank 1.0, on
            a per stream, per cell, per point basis
                rank[cell, stream, (x, y)] = rank of 'stream' transmitted by 'cell' seen at point 'xy' in the
            AoI
                pathGain: path gain from point A to point B, where A and B are both points in the
            deployment area
                pathGain[index_A, index_B] = path gain from point A to point B
                TxPower: the transmit power of one antenna
                nStreams: the number of unique data streams that radio in this network produce
                e.g. if goal is 4x4 MIMO, nStreams = 4
                cumulativeSignal: the total signal received at a point in the AoI (signals are weighted
            based on the rank of each stream signal received)
                NOTES:
                * the terms 'radios', 'radio resources', 'data streams', & 'streams' are used
            interchangeably
                */
                /* signal from point A to point B, where A is a transmitting point and B is a receiving
            point, in the deployment area */
                signal = TxPower * pathGain
                // for each cell in the deployment...
                for (cell = 1; cell <= max(deployment.cellID)) {
                    // ...find which antennas are in this cell
                    cellMask = deployment, cellID == cell
                    // ...for each stream transmitted in this cell...
                    for (stream = 1; stream < nStreams) {
                        // ...find which antennas are transmitting this stream
                        cellStreamMask = cellMask & deployment.stream == stream
                        // ...for each point in the AoI...
                        for (xy in xyArea) {
                            /* ...calculate the weighted summed signal strength of all streams received in this
            location, transmitted by antennas in this cell */
                            streamSignal = sum(signal[(deployment[cellStreamMask].x,
            deployment[cellStreamMask].y), xy])
                            weightedStreamSignal[cell, xy] += rank[cell, stream, xy] * streamSignal
                            //Alternatively: aggregatedCellSignal[cell,xy] += streamSignal
                        }
                    }
                    /* ...find which cell transmits the strongest signal to each point and save that signal
            level to the cumulative signal */
                    cumulativeSignal = max(cumulativeSignal, weightedStreamSignal[cell] / nStreams)
                    //Alternatively: cumulativeSignal = max(cumulativeSignal, aggregatedCellSignal[cell])
                }
            }
```

```
[ totalRank ] = calculateRank ( deployment, xyArea, rank, nStreams ) {
    /*
    deployment: x and y coordinates AND cell IDs of all the antennas deployed in
deployment area
        xyArea: x & y coordinates for every point in the Area of Interest (AoI)
        xyArea[index] = (x[index], y[index])
        rank: the ratio of a streams signal strength to the signal level that results in Rank 1.0, on
a per stream, per cell, per point basis
        rank[cell, stream, (x, y)] = rank of 'stream' transmitted by 'cell' seen at point 'xy' in the
AoI
        nStreams: the number of unique data streams that radio in this network produce
        e.g. if goal is 4x4 MIMO, nStreams = 4
        totalRank: same as rank but on a per point basis
        totalRank[(x, y)] = rank of all streams transmitted by the strongest cell seen at point 'xy'
in the AoI
        NOTES:
        * the terms 'radios', 'radio resources', 'data streams', & 'streams' are used
interchangeably
    */
    totalRankPerCell = zeros(size(xyArea))
    totalRank = zeros(size(xyArea))
    // for each cell in the deployment...
    for (cell = 1; cell <= max(deployment.cellID)) {
        // ...for each stream transmitted in this cell...
        for (stream = 1; stream < nStreams) {
            // ...for each point in the AoI...
            for (xy in xyArea) {
                // ...the total rank in the area served by this cell, is the sum of the per stream rank
                totalRankPerCell[cell, xy] += rank[cell, stream, xy]
            }
        }
        // ...the total rank at each point, is the maximum rank achieved by any cell
totalRank = max(totalRankPerCell, totalRank)
    }
}
[ rank ] = calculateRankPerStream ( deployment, xyArea, pathGain,
interferenceAncNoise, TxPower, nStreams, thresholdForRank1 ) {
    /*
    deployment: x and y coordinates AND cell IDs of all the antennas deployed in
deployment area
        xyArea: x & y coordinates for every point in the Area of Interest (AoI)
        xyArea[index] = (x[index], y[index])
        pathGain: path gain from point A to point B, where A and B are both points in the
deployment area
        pathGain[index_A, index_B] = path gain from point A to point B
        interferenceAncNoise: random noise and interference from other sources received at
each point in the AoI
        interferenceAncNoise[index] = noise and interference at xyArea[index]
        TxPower: the transmit power of one antenna
        nStreams: the number of unique data streams that radio in this network produce
        e.g., if goal is 4x4 MIMO, nStreams = 4
        thresholdForRank1: signal level that results in Rank 1.0
        rank: the ratio of a streams signal strength to the signal level that results in Rank 1.0, on
a per stream, per cell, per point basis
        rank[cell, stream, (x, y)] = rank of 'stream' transmitted by 'cell' seen at point 'xy' in the
AoI
        NOTES:
        * the terms 'radios', 'radio resources', 'data streams', & 'streams' are used
interchangeably
    */
    /* signal from point A to point B, where A is a transmitting point and B is a receiving
point, in the deployment area */
    signal = TxPower * pathGain − interferenceAncNoise
    // for each cell in the deployment...
    for (cell = 1; cell <= max(deployment.cellID)) {
        // ...find which antennas are in this cell
        cellMask = deployment, cellID == cell
        // ...for each stream transmitted in this cell...
        for (stream = 1; stream < nStreams) {
            // ...find which antennas are transmitting this stream
            cellStreamMask = cellMask & deployment.stream == stream
            // ...for each point in the AoI...
            for (xy in xyArea) {
                /* ...calculate the summed signal strength of this stream received in this location,
transmitted by antennas in this cell */
                cellStreamSignal[cell, stream, xy] = sum(signal[(deployment[cellStreamMask].x,
deployment[cellStreamMask].y), xy])
            }
            // the rank of this stream (at each point) is the minimum of the calculated ratio or 1
```

```
            signalRatioToThreshold = cellStreamSignal[cell, stream] / thresholdForRank1
            rank[cell, stream] = min(1, signalRatioToThreshold)
        }
    }
}
```

Figure 11:
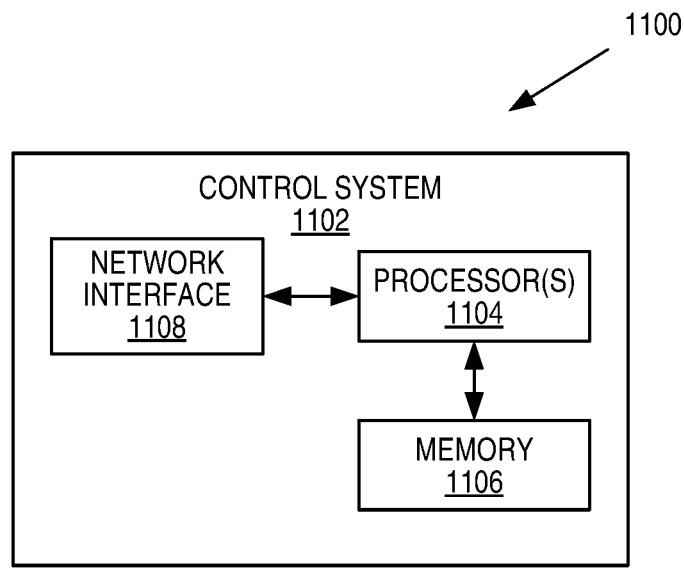
FIG. 11 is a schematic block diagram of a computation node, according to some embodiments of the present disclosure.

FIG. 11 is a schematic block diagram of a computation node 1100 according to some embodiments of the present disclosure. As illustrated, the computation node 1100 includes a control system 1102 that includes one or more processors 1104 (e.g., Central Processing Units (CPUs), Application Specific Integrated Circuits (ASICs), Field Programmable Gate Arrays (FPGAs), and/or the like), memory 1106, and a network interface 1108. The one or more processors 1104 are also referred to herein as processing circuitry. The one or more processors 1104 operate to provide one or more functions of a computation node 1100 as described herein. In some embodiments, the function(s) are implemented in software that is stored, e.g., in the memory 1106 and executed by the one or more processors 1104.

Figure 12:
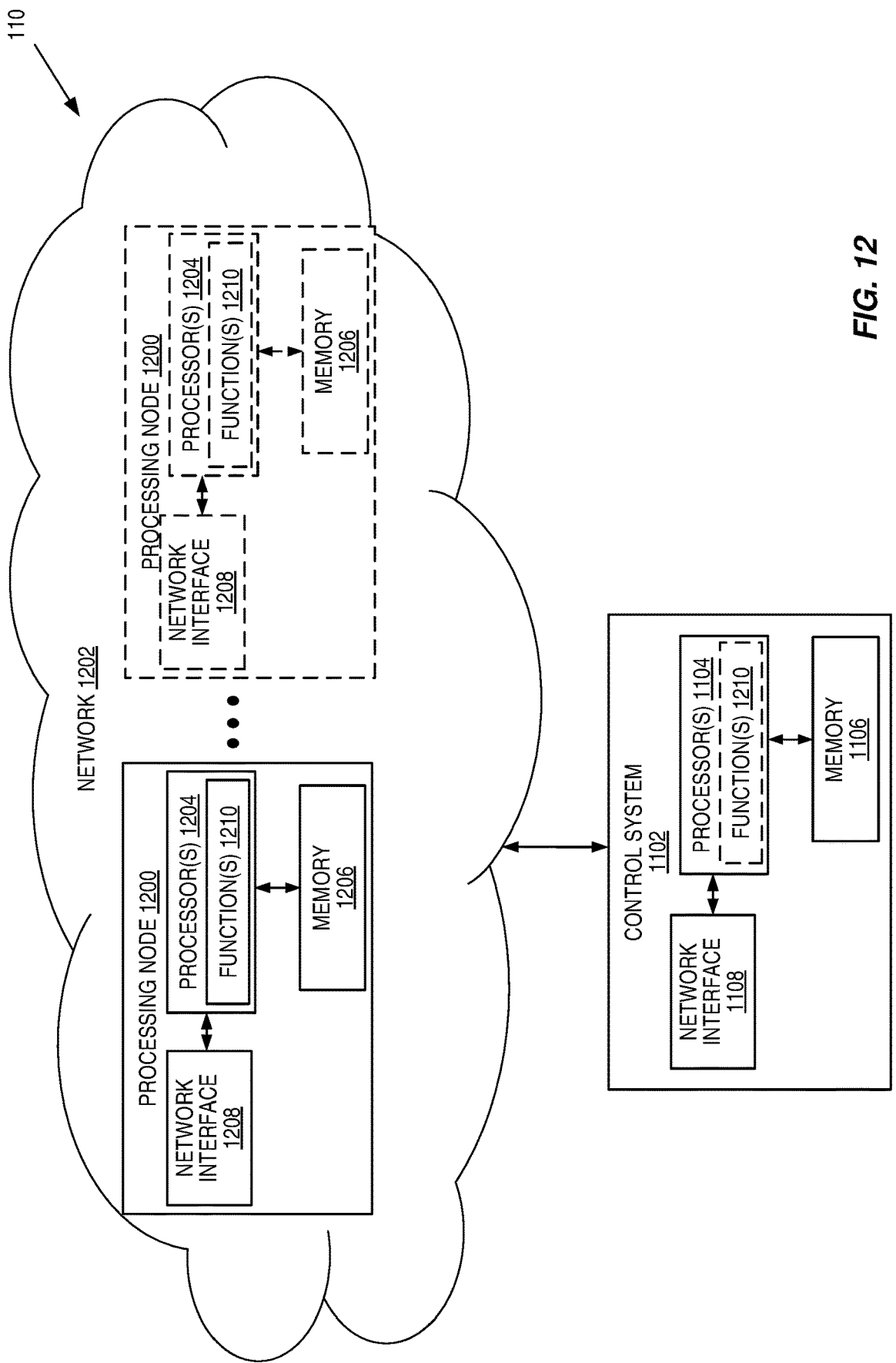
FIG. 12 is a schematic block diagram that illustrates a virtualized embodiment of the computation node according to some embodiments of the present disclosure.

FIG. 12 is a schematic block diagram that illustrates a virtualized embodiment of the computation node 1100 according to some embodiments of the present disclosure. This discussion is equally applicable to other types of network nodes or computation nodes. Further, other types of network nodes and computation nodes may have similar virtualized architectures.

As used herein, a "virtualized" computation node is an implementation of the computation node 1100 in which at least a portion of the functionality of the computation node 1100 is implemented as a virtual component(s) (e.g., via a virtual machine(s) executing on a physical processing node(s) in a network(s)). As illustrated, in this example, the computation node 1100 includes the control system 1102 that includes the one or more processors 1104 (e.g., CPUs, ASICs, FPGAs, and/or the like), the memory 1106, and the network interface. The control system 1102 is connected to one or more processing nodes 1200 coupled to or included as part of a network(s) 1202 via the network interface 1108. Each processing node 1200 includes one or more processors 1204 (e.g., CPUs, ASICs, FPGAs, and/or the like), memory 1206, and a network interface 1208.

In this example, functions 1210 of the computation node 1100 described herein are implemented at the one or more processing nodes 1200 or distributed across the control system 1102 and the one or more processing nodes 1200 in any desired manner. In some particular embodiments, some or all of the functions 1210 of the computation node 1100 described herein are implemented as virtual components executed by one or more virtual machines implemented in a virtual environment(s) hosted by the processing node(s) 1200. As will be appreciated by one of ordinary skill in the art, additional signaling or communication between the processing node(s) 1200 and the control system 1102 is used in order to carry out at least some of the desired functions 1210.

In some embodiments, a computer program including instructions which, when executed by at least one processor, causes the at least one processor to carry out the functionality of computation node 1100 or a node (e.g., a processing node 1200) implementing one or more of the functions 1210 of the computation node 1100 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 13:
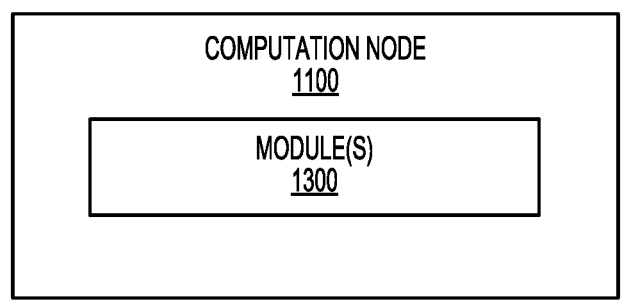
FIG. 13 is a schematic block diagram of the computation node according to some other embodiments of the present disclosure.

FIG. 13 is a schematic block diagram of the computation node 1100 according to some other embodiments of the present disclosure. The computation node 1100 includes one or more modules 1300, each of which is implemented in software. The module(s) 1300 provide the functionality of the computation node 1100 described herein. This discussion is equally applicable to the processing node 1200 of FIG. 12 where the modules 1300 may be implemented at one of the processing nodes 1200 or distributed across multiple processing nodes 1200 and/or distributed across the processing node(s) 1200 and the control system 1102.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Embodiments

1. A method performed by a computation node (1100) for determining a performance metric for an antenna deployment, the method comprising:
  obtaining (500, 600, 602, 604) the antenna deployment comprising a plurality of antennas and corresponding locations for the plurality of antennas, a cell assignment for the plurality of antennas such that each antenna is assigned to one cell out of one or more cells, and a resource assignment for the plurality of antennas such that each antenna is assigned to one radio resource out of one or more radio resources; and based on the antenna deployment, the cell assignment, and the resource assignment, determining (502, 606) at least one performance metric of the antenna deployment.

2. The method of embodiment 1, wherein at least one of obtaining the antenna deployment, obtaining the cell assignment, and obtaining the resource assignment comprises receiving the antenna deployment, the cell assignment, and the resource assignment, respectively.

3. The method of any of embodiments 1 to 2, wherein at least one of obtaining the antenna deployment, obtaining the cell assignment, and obtaining the resource assignment comprises generating the antenna deployment, the cell assignment, and the resource assignment, respectively.

4. The method of any of embodiments 1 to 3, wherein determining the at least one performance metric comprises determining (700) a rank of the antenna deployment.

5. The method of embodiment 4, wherein determining the rank of the antenna deployment comprises:
 determining (800) a minimum target metric required to achieve exactly a rank of one;
 for each cell (802) and for each data stream in this cell (804):
  i. determining (806) a target metric received in a given area;
  ii. determining (808) that a rank of this data stream is a ratio of the target metric to the minimum target metric; and
  iii. determining (810) that a rank of this cell is a sum of ranks of each data stream in this cell; and
 determining (812) that the rank of the antenna deployment is a maximum rank of the rank of each of the cells.

6. The method of embodiment 5, wherein the target metric is chosen from the group consisting of a Signal-to-Noise-Ratio, SNR, and a Signal-to-Interference-plus-Noise Ratio, SINR.

7. The method of any of embodiments 5 to 6, wherein the rank of this data stream is a maximum of one.

8. The method of any of embodiments 1 to 7, wherein determining the at least one performance metric comprises determining (702) a cumulative signal of the antenna deployment.

9. The method of embodiment 8, wherein determining the cumulative signal of the antenna deployment comprises:
 for each cell (900) determining (902) a signal power received from each data stream; and
 determining (904) that the cumulative signal of the antenna deployment is a weighted average of the signal power received from each data stream.

10. The method of embodiment 9, wherein the rank of each data stream is used as a weight for that data stream in the weighted average.

11. The method of any of embodiments 9 to 10, wherein determining the at least one performance metric further comprises determining (704) an achievable bitrate of the antenna deployment.

12. The method of embodiment 11, wherein determining the achievable bitrate of the antenna deployment comprises:
 converting (1000) the cumulative signal of the antenna deployment to at least one of the SNR and the SINR;
 mapping (1002) the at least one of the SNR and the SINR to a bitrate for each N×N Multiple-Input and Multiple-Output, MIMO, combination;
 determining (1004) a ceiling of the rank of the antenna deployment and a floor of the rank of the antenna deployment; and
 determining (1006) the achievable bitrate of the antenna deployment as the weighted average of the bitrate mapped to by the ceiling of the rank and the bitrate mapped to by the floor of the rank.

13. The method of embodiment 12, wherein the ceiling of the rank and the floor of the rank for the bitrate mapped to the ceiling of the rank and the floor of the rank is used as a weight for that bitrate in the weighted average.

14. A computation node (1100) for determining an assignment of radio resources to antennas, the computation node comprising:
 processing circuitry (1104, 1106, 1204, 1206) configured to perform any of the steps of any of embodiments 1 to 13; and
 power supply circuitry configured to supply power to the computation node (1100).

At least some of the following abbreviations may be used in this disclosure. If there is an inconsistency between abbreviations, preference should be given to how it is used above. If listed multiple times below, the first listing should be preferred over any subsequent listing(s).

| | |
|---|---|
| AoI | Area of Interest |
| ASIC | Application Specific Integrated Circuit |
| CPU | Central Processing Unit |
| DAS | Distributed Antenna System |
| DSP | Digital Signal Processor |
| EIP | Ericsson Indoor Planner |
| FPGA | Field Programmable Gate Array |
| MIMO | Multiple Input Multiple Output |
| RAM | Random Access Memory |
| ROM | Read Only Memory |
| SINR | Signal-to-Interference-plus-Noise Ratio |
| SNR | Signal-to-Noise Ratio |

Those skilled in the art will recognize improvements and modifications to the embodiments of the present disclosure. All such improvements and modifications are considered within the scope of the concepts disclosed herein.

What is claimed is:

1. A method performed by a computation node for determining a performance metric for an antenna deployment, the method comprising:
 obtaining the antenna deployment comprising a plurality of antennas and corresponding locations for the plurality of antennas, a cell assignment for the plurality of antennas such that each antenna is assigned to one cell out of one or more cells, and a resource assignment for the plurality of antennas such that each antenna is assigned to one radio resource out of one or more radio resources; and
 based on the antenna deployment, the cell assignment, and the resource assignment, determining a rank of the antenna deployment, where determining the rank of the antenna deployment comprises:
  determining a minimum target metric required to achieve exactly a rank of one;
  for each cell and for each data stream in this cell:
   determining a target metric received in a given area;
   determining that a rank of this data stream is a ratio of the target metric to the minimum target metric; and
   determining that a rank of this cell is a sum of ranks of each data stream in this cell; and
  determining that the rank of the antenna deployment is a maximum rank of a rank of each of the cells.

2. The method of claim 1, wherein at least one of obtaining the antenna deployment, obtaining the cell assignment, and obtaining the resource assignment comprises receiving the antenna deployment, the cell assignment, and the resource assignment, respectively.

3. The method of claim 1, wherein at least one of obtaining the antenna deployment, obtaining the cell assignment, and obtaining the resource assignment comprises generating the antenna deployment, the cell assignment, and the resource assignment, respectively.

4. The method of claim 1, wherein the target metric is chosen from the group consisting of a Signal-to-Noise-Ratio, SNR, and a Signal-to-Interference-plus-Noise Ratio, SINR.

5. The method of claim 1, wherein the rank of this data stream is a maximum of one.

6. The method of claim 1, further comprising determining a cumulative signal of the antenna deployment.

7. The method of claim 6, wherein determining the cumulative signal of the antenna deployment comprises:
for each cell determining a signal power received from each data stream; and
determining that the cumulative signal of the antenna deployment is a weighted average of the signal power received from each data stream.

8. The method of claim 7, wherein a rank of each data stream is used as a weight for that data stream in the weighted average.

9. The method of claim 7, wherein the cumulative signal of the antenna deployment is determined by summing the signals of all the data streams of the same cell.

10. The method of claim 7, further comprising: determining an achievable bitrate of the antenna deployment.

11. The method of claim 10, wherein determining the achievable bitrate of the antenna deployment comprises:
converting the cumulative signal of the antenna deployment to at least one of the SNR and the SINR;
mapping the at least one of the SNR and the SINR to a bitrate for each N×N Multiple-Input and Multiple-Output, MIMO, combination;
determining a ceiling of the rank of the antenna deployment and a floor of the rank of the antenna deployment; and
determining the achievable bitrate of the antenna deployment as the weighted average of the bitrate mapped to by the ceiling of the rank and the bitrate mapped to by the floor of the rank.

12. The method of claim 11, wherein the ceiling of the rank and the floor of the rank for the bitrate mapped to the ceiling of the rank and the floor of the rank is used as a weight for that bitrate in the weighted average.

13. A computation node for determining an assignment of radio resources to antennas, the computation node comprising:
processing circuitry configured to:
obtain an antenna deployment comprising a plurality of antennas and corresponding locations for the plurality of antennas, a cell assignment for the plurality of antennas such that each antenna is assigned to one cell out of one or more cells, and a resource assignment for the plurality of antennas such that each antenna is assigned to one radio resource out of one or more radio resources; and
based on the antenna deployment, the cell assignment, and the resource assignment, determine a rank of the antenna deployment, where determining the rank of the antenna deployment comprises the processing circuitry further being configured to:
determine a minimum target metric required to achieve exactly a rank of one;
for each cell and for each data stream in this cell:
determine a target metric received in a given area;
determine that a rank of this data stream is a ratio of the target metric to the minimum target metric; and
determine that a rank of this cell is a sum of ranks of each data stream in this cell; and
determine that the rank of the antenna deployment is a maximum rank of a rank of each of the cells.

14. The computation node of claim 13, wherein at least one of obtaining the antenna deployment, obtaining the cell assignment, and obtaining the resource assignment comprises the processing circuitry further configured to receive the antenna deployment, the cell assignment, and the resource assignment, respectively.

15. The computation node of claim 13, wherein at least one of obtaining the antenna deployment, obtaining the cell assignment, and obtaining the resource assignment comprises the processing circuitry further configured to generate the antenna deployment, the cell assignment, and the resource assignment, respectively.

16. The computation node of claim 15, wherein the target metric is chosen from the group consisting of a Signal-to-Noise-Ratio, SNR, and a Signal-to-Interference-plus-Noise Ratio, SINR.

17. The computation node of claim 15, wherein the rank of this data stream is a maximum of one.

18. The computation node of claim 15, wherein the processing circuitry is further configured to determine a cumulative signal of the antenna deployment.

19. The computation node of claim 18, wherein determining the cumulative signal of the antenna deployment comprises the processing circuitry further being configured to:
for each cell determine a signal power received from each data stream; and
determine that the cumulative signal of the antenna deployment is a weighted average of the signal power received from each data stream.

20. The computation node of claim 19, wherein a rank of each data stream is used as a weight for that data stream in the weighted average.

21. The computation node of claim 19, wherein the cumulative signal of the antenna deployment is determined by summing the signals of all the data streams of the same cell.

22. The computation node of claim 19, wherein the processing circuitry is further configured to determine an achievable bitrate of the antenna deployment.

23. The computation node of claim 22, wherein determining the achievable bitrate of the antenna deployment comprises the processing circuitry further configured to:
convert the cumulative signal of the antenna deployment to at least one of the SNR and the SINR;
map the at least one of the SNR and the SINR to a bitrate for each N×N Multiple-Input and Multiple-Output, MIMO, combination;
determine a ceiling of the rank of the antenna deployment and a floor of the rank of the antenna deployment; and
determine the achievable bitrate of the antenna deployment as the weighted average of the bitrate mapped to by the ceiling of the rank and the bitrate mapped to by the floor of the rank.

24. The computation node of claim 23, wherein the ceiling of the rank and the floor of the rank for the bitrate mapped to the ceiling of the rank and the floor of the rank is used as a weight for that bitrate in the weighted average.

* * * * *